United States Patent Office 3,086,051
Patented Apr. 16, 1963

3,086,051
PRODUCTION OF CYCLOHEXANOL, MONO-CYCLOHEXYLAMINE, AND DICYCLOHEX-YLAMINE
Guenter Poehler, Ludwigshafen (Rhine), and Anton Wegerich, Limburgerhof, Pfalz, Germany, assignors to Badische Anilin- & Soda-Fabrik Aktiengesellschaft, Ludwigshafen (Rhine), Germany
No Drawing. Filed May 2, 1960, Ser. No. 25,872
Claims priority, application Germany May 5, 1959
6 Claims. (Cl. 260—563)

This invention relates to a process for the production of cyclohexanol. More specifically, the invention relates to a process for the production of cyclohexanol by hydrogenating treatment of nitrobenzene.

It is known to prepare cyclohexanol and cyclohexanone by reaction of nitrobenzene with hydrogen and water at elevated temperature under normal pressure. When carrying out the process at atmospheric pressure, there are formed, besides cyclohexanol, large amounts of cyclohexanone and amines which combine to form azomethine and this renders the separation of the reaction product difficult and diminishes the yields. Moreover the reaction partly comes to a standstill at the stage of aniline formation so that large amounts of this substance are present in the reaction product.

If the reaction is carried out under increased pressure, the withdrawal of heat is even more difficult than at normal pressure by reason of the large amount of heat evolved. The catalyst is therefore damaged by local overheating. It has therefore been proposed to use a very great hydrogen dilution in order to avoid these troubles. The course of the reaction is thereby considerably retarded and it has therefore not hitherto been possible to carry out this reaction on an industrial scale.

The invention starts from a process for the production of cyclohexanol as well as mono- and dicyclohexylamine by reaction of nitrobenzene with hydrogen and water at elevated temperature and in the presence of catalysts.

The invention relates to a process of this kind in which a preheated substantially liquid mixture of nitrobenzene and water is brought together with hydrogen, or a mixture of hydrogen and water vapor, at a pressure above about 60 atmospheres and preheated to 150° to 300° C., prior to contacting with the catalyst, in such a way that a mixing temperature of 160° to 250° C., preferably 180° to 220° C., is set up and the weight ratio of nitrobenzene to liquid water lies between 1:1 and 1:3, the mixture is then led at rising temperature over a catalyst, with a hydrogen partial pressure of at least 30 atmospheres, a rise of the temperature above 300° C. being prevented at any point in the catalyst zone by the amount and mixing ratio of the liquid water to the nitrobenzene used.

In this process there is no overheating in the catalyst chamber so that the catalyst is not damaged.

In carrying out the process in practice, the initial materials, i.e., nitrobenzene, water and hydrogen, possibly with water vapor, are led either downwardly or upwardly through a vertical reactor provided with a rigidly arranged catalyst and the reaction mixture is withdrawn in gaseous phase. In both cases a thorough mixing of the liquid components (water and nitrobenzene) which are not soluble in each other is necessary shortly before contacting them with the catalyst.

In order to promote the initiation of the reaction, it is advantageous to trickle over the catalyst at first 1 to 7, especially 2 to 6, cubic meters of nitrobenzene and water per square meter of cross-section of the catalyst chamber. The lower the temperature of entry of the initial materials, for example 160° to 180° C., the smaller should the density of trickling be, for example 1 to 3.5 cubic meters. A satisfactory uniform trickling is achieved when there is provided in the reaction chamber, above the actual catalyst zone, a small layer of packing material, for example rings or bodies of other suitable shape, of metal, ceramic material or plastics, through which the initial materials are led prior to their entry into the actual catalyst zone. A uniform trickling can also be achieved by suitable dispersing means, such as jets or roses, through which the initial materials are introduced into the catalyst zone.

If the initial materials are led upwardly through the layer of catalyst, the liquid initial mixture is led into a space free from catalyst at the lower end of the vertical reaction vessel in which a liquid sump forms. Into this is led hydrogen, possibly together with water vapor, at high speed in a finely divided form through dispersing means, as for example jets or porous plates. In the case of jets, the speed may be, for example, 10 to 20 meters per second. In this way a thorough mixing is achieved which lasts into the catalyst chamber.

An advantageous embodiment of the process consists in heating nitrobenzene and water together to 100° to 250° C. and bringing them together outside the catalyst layer with hydrogen which has been heated to 150° to 300° C. or even higher, preferably more than 200° C. The preheating of the hydrogen may also be carried out together with water so that the hydrogen is laden with water vapor. When the components are brought together, for example in the layer of packing material, a part of the liquid vaporizes and a mixing temperature is set up. The mixing temperature should be at least as high as the necessary initiation temperature of the reaction which is 160° C., for example it may be 160° to 250° C. It is advantageous to set up a mixing temperature of 180° to 200° C. or 220° C. The proportion of the water remaining liquid should at the most amount to three times the quantity of nitrobenzene used. The reaction is in general carried out at a total pressure between 60 and 350 atmospheres. The hydrogen partial pressure should be at least 30 atmospheres. In general hydrogen partial pressures above 50 atmospheres, advantageously above 80 atmospheres up to about 300 atmospheres, are used.

The hydrogen is preferably used in such an amount that its speed relatively to the cross-section of the empty reaction vessel is greater than $$\frac{1}{dc\gamma}$$

meters per second, in which $dc$ is the mean diameter of the catalyst granules in the case of a finely divided or granulated catalyst or the mean diameter of a molded catalyst and $\gamma$ is the density of the hydrogen or mixture of hydrogen and water vapor expressed in kilograms per cubic meter under the prevailing reaction conditions. By high speeds of flow, the vaporization and consequently the cooling of the catalyst is promoted. The speed is advantageously adjusted to be more than $$\frac{3}{dc\gamma}$$

meter per second. In practice a speed of flow has proved to be suitable which lies between $$\frac{6}{dc\gamma} \text{ and } \frac{15}{dc\gamma}$$

meters per second with reference to the cross-section of the empty reaction vessel. It is preferable to set up high gas speeds at low pressures. Since at very high gas speeds, attrition is increased in the reaction vessel filled with catalyst by the high resistance, it is advantageous to choose a pressure above 60 atmospheres. This high pressure is especially favorable to prevent the formation of cyclohexanone. Gas speeds of, for example, more than 0.08, especially between 0.5 and 1.2, meters per second are suitable at 60 atmospheres, and at 150 atmospheres gas speeds above about 0.03, especially between 0.2 and 0.5, meter per second are suitable. At a reaction pressure of 150 atmospheres and a diameter of the empty reaction vessel of 200 mm., about 1,000 to 5,000 cubic meters of hydrogen (N.T.P.) can be passed through per hour.

In order to obtain a reaction mixture which contains mainly cyclohexanol there are used a large amount of water within the specified limits and a hydrogen-water vapor mixture which has been heated up to high temperatures, for example 250° to 300° C. If, on the other hand, it is desired to produce a reaction product which contains, besides cyclohexanol, large amounts of mono- and dicyclohexylamine, a small amount of water is used and the hydrogen is not heated to such a high temperature. The water can be partly replaced by cyclohexylamine and/or cyclohexanol. No water vapor is added to the hydrogen.

Since the reaction is in general ended after a short time, i.e., after passage through a relatively small layer of catalyst, in general at temperatures above 220° C., as for example 250° to 300° C., the reaction can be carried out in large vertical reaction vessels or a plurality of consecutive vessels, and a plurality of supply and distribution means for fresh initial material can be provided through which, in the direction of flow, fresh nitrobenzene-water mixture can be introduced, for example in amounts up to 6 cubic meters per square meter of the cross-section of the catalyst chamber, about 2 to 3 parts by weight of water being added for each part by weight of nitrobenzene. Hydrogen may also be added again. The depth of the catalyst zone which must be traversed to complete the reaction depends on the height of the reaction temperature.

The reaction vessel is preferably insulated against heat loss so that a uniform distribution of temperature is ensured over the whole cross-section of flow in the interior of the reaction chamber. The reaction begins at 160° to about 200° C. By reason of the exothermic course of the reaction, the reaction temperature in the catalyst layer rises in the direction of flow of the liquid initial materials by at least 20° C., for example by 60° to 120° C. The heat set free at the catalyst is absorbed by the liquid and the gas. By reason of the strongly turbulent gas flow, a rapid evaporation of the liquid in the hydrogen gas takes place and this is attended by intense cooling. Since the reaction temperature in the catalyst chamber should not exceed 300° C., and is preferably kept between 250° and 280° C., a definite ratio of nitrobenzene to water is necessary which lies between 1:1 and 1:3. By adding water it is possible to regulate the temperature within these limits. Upon a marked rise in temperature, a larger amount of water may be added than when the rise in temperature is smaller. For example a ratio of nitrobenzene to water between 1:1.6 and about 1:2.5 is chosen when the temperature rise is more than about 80° C. and the final temperature in the catalyst layer is about 300° C. or more. When the activity of the catalyst subsides, the final temperature of the catalyst layer through which the initial materials flow can be raised by about 30° C. in the last third thereof.

As catalysts there may be used any well-known hydrogenation catalyst, e.g. the metals or compounds of the metals of the iron or platinum group, and also the oxides or sulfides of the metals of the 5th and 6th groups of the periodic system, possibly with copper and/or manganese compounds. The catalysts may be applied to suitable carriers, for example to silica, natural or synthetic silicates, pumice, titanium oxide, magnesium oxide, zirconium oxide, thorium oxide, aluminas or the masses containing iron oxide (Bayer masses) obtained in the production of aluminum. Nickel catalysts which contain 1 to 20% by weight of nickel are especially suitable. They may also contain copper, chromium, molybdenum, cobalt or manganese, preferably in smaller amounts than the nickel. The oxides of these additional metals are also suitable.

According to the process of the present invention it is possible to produce from nitrobenzene, in a continuous operation and with high space-time yields, a reaction product which consists mainly of cyclohexanol and mono- and dicyclohexylamine and contains neither nitrobenzene nor aniline. The passage times for the initial materials may be reduced to less than 1 minute.

The following example will further illustrate this invention but the invention is not restricted to this example.

*Example*

The apparatus is a vertically arranged tube having a length of 13 meters and a diameter of 200 mm. containing a catalyst consisting of silica with 15% of nickel and 5% of copper. The catalyst is used in granulated form with a granule diameter of 5 mm. Above the catalyst there is situated a layer 50 centimeters thick of annular filler bodies of iron.

50 liters of nitrobenzene and 100 liters of water are preheated to 180° C. under a pressure of 200 atmospheres. 3000 cubic meters (N.T.P.) of hydrogen are heated up to 250° C. under a pressure of 200 atmospheres. The two components are introduced into the reaction chamber through Raschig rings. The reactants trickle over the annular filler bodies and a mixing temperature of 190° C. is set up. At this temperature the reaction begins at the catalyst. The temperature in the reaction chamber rises to 275° C. The gas speed is 0.35 meter per second with reference to the empty tube.

The mixture, consisting of hydrogen, steam and the reaction product, leaving the reaction chamber at 275° C. is cooled and condensed. The reaction product consists of 71.1% of cyclohexanol, 19.2% of monocyclohexylamine and 9.7% of dicyclohexylamine and is separated into its components by distillation.

What we claim is:

1. In a method for the production of cyclohexanol, together with monocyclohexylamine and dicyclohexylamine, by the exothermic reaction of nitrobenzene with hydrogen and water at elevated temperature and under pressure in the presence of a hydrogenation catalyst, the improvement which comprises: first preheating and mixing a substantially liquid mixture of nitrobenzene and water, prior to contact with said hydrogenation catalyst, with a gaseous component selected from the group consisting of hydrogen and a mixture of hydrogen and water vapor to provide an initial reaction mixture having a temperature of from 160° C. to 250° C., a total pressure of at least 60 atmospheres with a partial pressure of hydrogen of at least 30 atmospheres and a ratio by weight of nitrobenzene to liquid water of between 1:1 and 1:3; and then leading said initial reaction mixture over said hydrogenation catalyst at said total pressure and said hydrogen partial pressure and at a temperature increased by the exothermic reaction to a value of over 220° C. but not higher than 300° C.

2. A method as claimed in claim 1 wherein the temperature of said reaction mixture in contact with said hydrogenation catalyst is controlled by adjusting the relative proportions of nitrobenzene and liquid water.

3. A method as claimed in claim 1 wherein the reaction mixture is contacted with said hydrogenation catalyst at a temperature between about 250° C. and 280° C.

4. A method as claimed in claim 1 wherein said liquid mixture of nitrobenzene and water is preheated to a temperature of 100° C. to 250° C. and brought together with said hydrogen-containing gaseous component which has been preheated to a temperature of from 150° C. to about 300° C. such that the resulting initial reaction mixture, prior to contact with said hydrogenation catalyst, has a temperature of from 160° C. to 250° C.

5. A method as claimed in claim 1 wherein the catalytic hydrogenation reaction is carried out at a total pressure of between 60 and 350 atmospheres.

6. A method as claimed in claim 1 wherein the initial reaction mixture is contacted sequentially with said hydrogenation catalyst in a plurality of separate catalyst zones, a fresh supply of preheated nitrobenzene and water being introduced between each catalyst zone, the partial pressure of hydrogen in each catalyst zone being at least 30 atmospheres and each catalyst zone being maintained under a total pressure of 60 to 350 atmospheres and at a temperature of about 220° C. but not more than 300° C.

References Cited in the file of this patent

UNITED STATES PATENTS 2,481,922     Hager _____ Sept. 13, 1949

FOREIGN PATENTS 576,680     Great Britain _____ Apr. 15, 1946

UNITED STATES PATENT OFFICE
CERTIFICATE OF CORRECTION

Patent No. 3,086,051                                  April 16, 1963

Guenter Poehler et al.

It is hereby certified that error appears in the above numbered patent requiring correction and that the said Letters Patent should read as corrected below.

Column 6, line 4, for "about" read -- above --.

Signed and sealed this 24th day of December 1963.

(SEAL)
Attest:

ERNEST W. SWIDER
Attesting Officer

EDWIN L. REYNOLDS

Acting Commissioner of Patents